United States Patent [19]

Ream et al.

[11] Patent Number: 5,334,397
[45] Date of Patent: Aug. 2, 1994

[54] BUBBLE GUM FORMULATION

[75] Inventors: Ronald L. Ream, Plano; Christine L. Corriveau, Orland Park; William J. Wokas, Bolingbrook, all of Ill.

[73] Assignee: Amurol Products Company, Naperville, Ill.

[21] Appl. No.: 914,367

[22] Filed: Jul. 14, 1992

[51] Int. Cl.$^5$ ............................................. A23G 3/30
[52] U.S. Cl. ................................ 426/5; 426/96; 426/650; 426/548; 426/804
[58] Field of Search .......................... 426/3–6, 426/96, 804, 548, 650

[56] References Cited

U.S. PATENT DOCUMENTS

| | | | |
|---|---|---|---|
| 2,886,440 | 5/1959 | Kramer et al. | 99/135 |
| 3,795,744 | 3/1974 | Ogawa et al. | 426/5 |
| 4,051,268 | 9/1977 | Shires et al. | 426/548 |
| 4,158,068 | 6/1979 | Von Rymon Lipinski | 426/548 |
| 4,386,106 | 5/1983 | Merritt et al. | 426/5 |
| 4,536,396 | 8/1985 | Stephens, Jr. et al. | 514/2 |
| 4,724,151 | 2/1988 | Mansukhani et al. | 426/3 |
| 4,775,537 | 10/1988 | Calakro et al. | 426/5 |
| 4,863,745 | 9/1989 | Zibell | 426/5 |
| 4,931,295 | 6/1990 | Courtright et al. | 426/5 |
| 4,978,537 | 12/1990 | Song | 426/5 |
| 5,004,595 | 4/1991 | Cherukuri et al. | 426/5 |
| 5,064,658 | 11/1991 | Cherukuri et al. | 426/3 |

FOREIGN PATENT DOCUMENTS

| | | | |
|---|---|---|---|
| 91-073871 | 10/1991 | Australia | A23L 1/236 |
| 2028934 | 5/1991 | Canada | A23L 1/22 |
| 0265386 | 4/1988 | European Pat. Off. | A23G 3/30 |
| 0314626 | 5/1989 | European Pat. Off. | A23L 1/22 |
| 0418616 | 3/1991 | European Pat. Off. | A23L 1/236 |
| 0420728 | 4/1991 | European Pat. Off. | A23L 1/236 |
| 0426428 | 5/1991 | European Pat. Off. | A23G 3/30 |
| 3120857 | 1/1983 | Fed. Rep. of Germany . | |
| 1228510 | 8/1960 | France . | |
| 2-174650 | 7/1990 | Japan | A23L 1/236 |
| 2-276553 | 11/1990 | Japan | A23L 1/236 |
| 1568875 | 6/1980 | United Kingdom | A23L 1/236 |

*Primary Examiner*—Jeanette Hunter
*Attorney, Agent, or Firm*—Willian Brinks Hofer Gilson & Lione

[57] ABSTRACT

An improved fruit flavored chewing gum having more intense and longer lasting sweetness and flavor is prepared, by including within the chewing gum, a) a spray dried fruit flavor ingredient having a high loading of active fruit flavor, b) encapsulated acesulfame-K, and c) separately encapsulated aspartame.

38 Claims, 2 Drawing Sheets

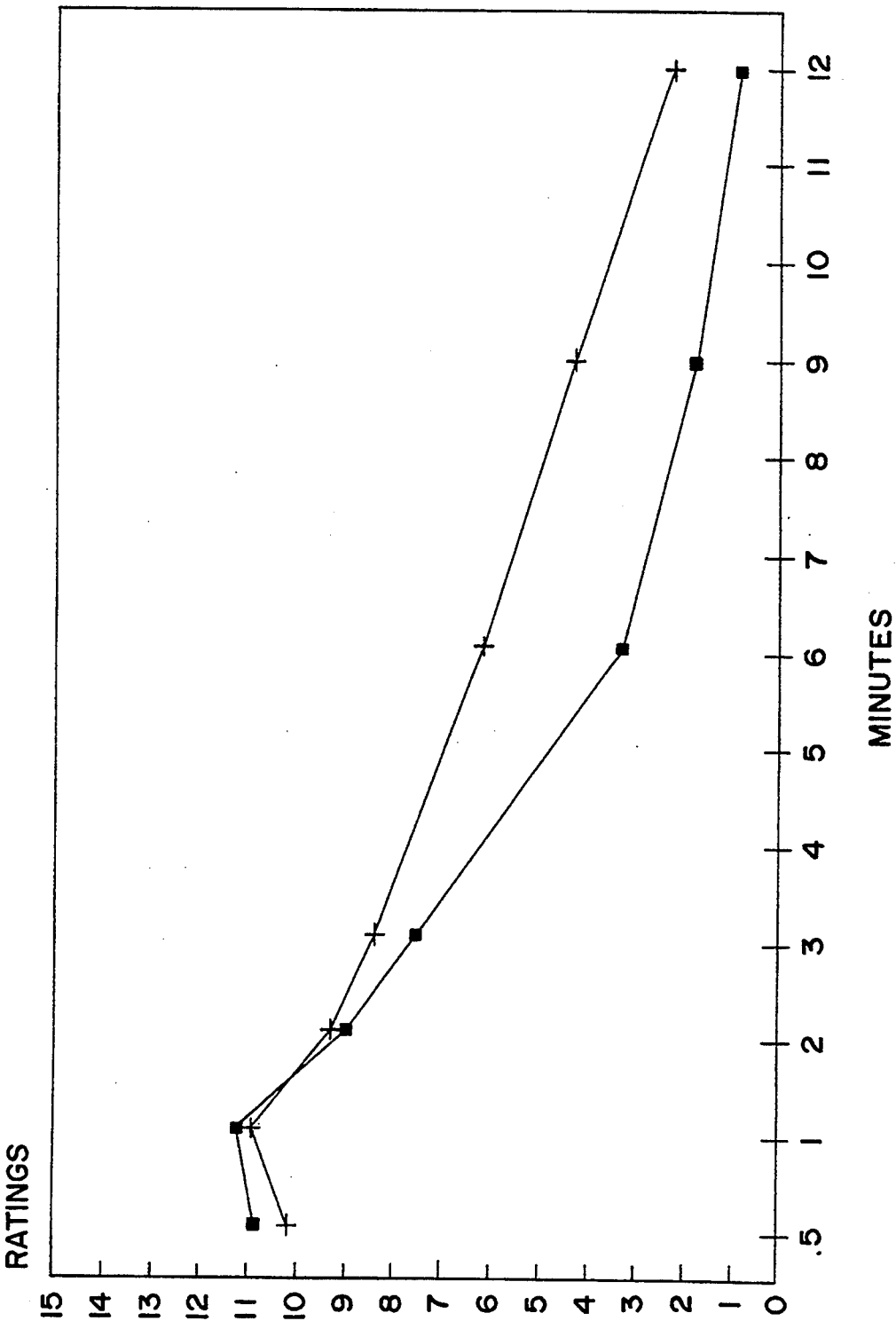

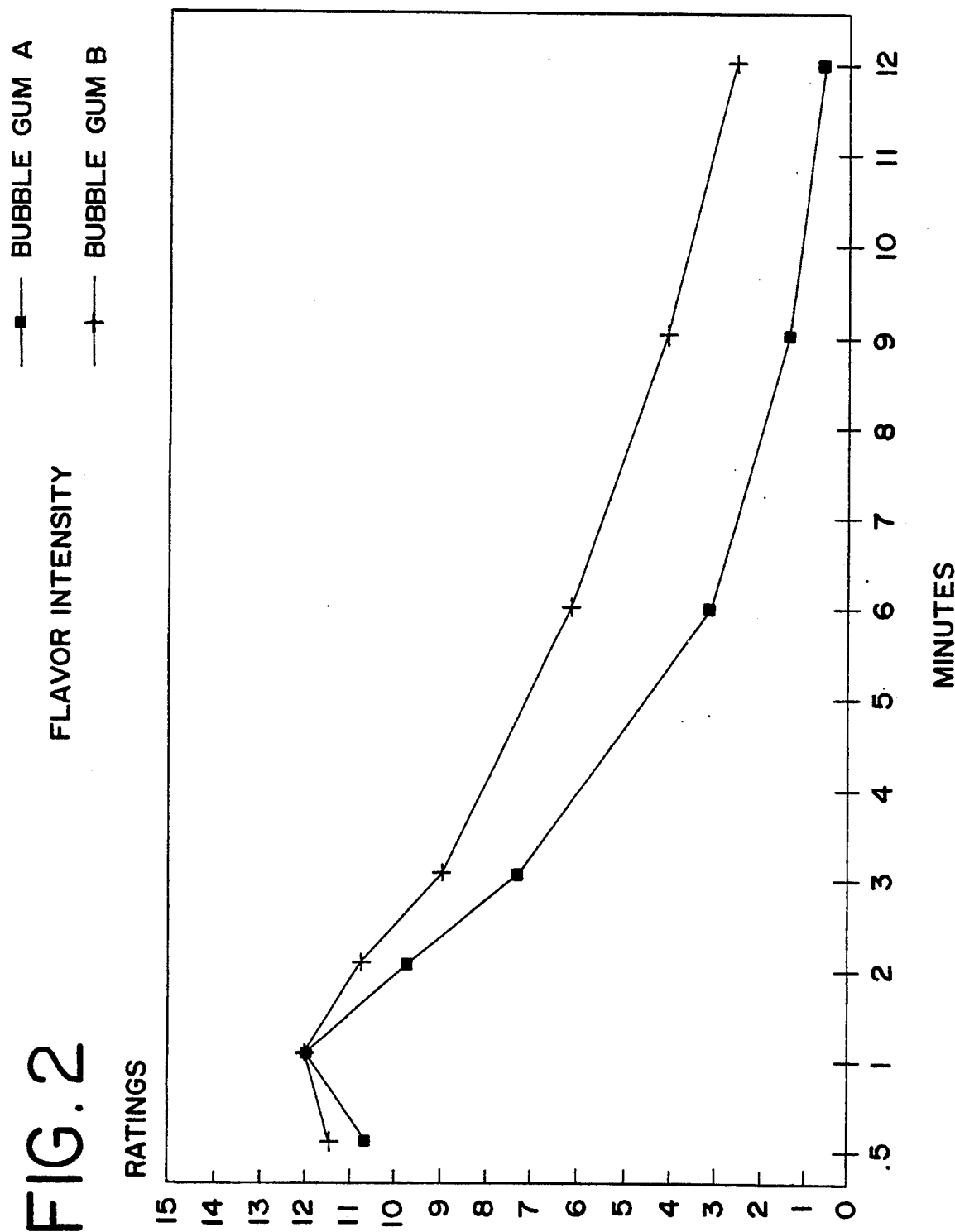

BUBBLE GUM FORMULATION

FIELD OF THE INVENTION

The present invention relates to a bubble gum formulation having improved, longer lasting sweetness and flavor.

BACKGROUND OF THE INVENTION

Chewing gums typically known in the art contain many ingredients, including sweeteners and flavor ingredients. It is often desirable to produce a chewing gum having a high degree of sweetness and flavor. However, one of the limitations of chewing gum is that the sweetness and flavor are rapidly lost during chewing. This is especially true of bubble gums and other "fast release" chewing gums which release their sweetness and flavor compounds rapidly, creating an initial burst of high intensity sweetness and flavor which is initially pleasing to the consumer but which dissipates quickly during chewing.

"Slow release" chewing gums, on the other hand, release their sweetness and flavor over a longer period of time but do not provide an initial burst of high intensity sweetness and flavor. Thus, the consumer who desires a high initial sweetness and flavor impact must often sacrifice the enjoyment of long lasting sweetness and flavor. The consumer who desires a chewing gum having a longer lasting sweetness and flavor must often forego the enjoyment of an initially high sweetness and flavor impact. Chewing gum manufacturers are constantly trying to extend the time in which consumers can enjoy the sweetness and flavor of chewing gum without sacrificing the quality of the initial sweetness and flavor impact.

The use of fruit flavors in chewing gum has become very common, especially in bubble gum. Fruit flavors typically contain a combination of fruit esters and may contain orange oil, lemon oil or other natural oils. Fruit flavors used in chewing gum include, but are not limited to, banana, cherry, apple, pineapple, grape, strawberry and blends including commonly known tutti frutti and other bubble gum flavors.

Fruit esters tend to release from chewing gum very quickly causing the chewing gum to have a relatively short flavor duration. Also, fruit esters typically have a light flavor quality, causing the chewing gum to have a low flavor impact. The use of fruit oils such as orange and lemon oil, or certain other flavor oils such as clove oil and oil of wintergreen, tends to increase the duration and impact of the fruit flavors to some extent. However, there is still a need or desire in the chewing gum industry for techniques which further enhance the impact and duration of the sweetness and flavor of bubble gum and other fruit flavored chewing gums.

Aspartame, also known as N-L-alpha-aspartyl-L-phenylalanine-l-methyl ester, and acesulfame-K, also known as the potassium salt of 6-methyl-1,2,3-oxathiazin-4(3H)-one-2,2-dioxide, are two commonly known high intensity sweetener ingredients. U.S. Pat. No. 5,064,658, issued to Cherukuri et al., discloses an enhanced sweetening effect which results in chewing gum when aspartame and acesulfame-K are combined together and encapsulated to form a single encapsulated sweetener composition containing weight ratios of aspartame to acesulfame-K of about 20:80 or about 40:60. Overall, the encapsulated sweetening agent composition contains about 0.01% to about 50% by weight of the combination of aspartame and acesulfame-K. The chewing gum composition itself contains about 0.065% to about 0.095% by weight of the aspartame. The aspartame and acesulfame-K are encapsulated together as a core, using a coating layer of polyvinyl acetate.

European Publication No. 0,314,626, to Cherukuri et al., discloses a delivery system wherein spray dried flavors or other powdered flavors are encapsulated in a matrix that includes a sweetness enhancer and hydrophobic material selected from the group consisting of fats, waxes, and mixtures thereof. The sweetener enhancer is selected from the group consisting of thaumatin, monellin, dihydrochalcones and mixtures thereof. The use of additional "auxiliary" sweeteners is also disclosed, including aspartame or acesulfame-K.

U.S. Pat. No. 4,536,396, issued to Stephens, Jr., discloses a possible synergistic effect between aspartame and acesulfame-K. U.S. Pat. No. 4,158,068, issued to Von Rymon Lipinski et al., and British Patent 1,568,875, issued to Hoechst Aktiengesellschaft, both disclose a synergistic effect between aspartame and the potassium salt of 3,4-dihydro-5-methyl-1,2,3-oxathiazine-4-one-2,2-dioxide, commonly known as acetosulfame.

SUMMARY OF THE INVENTION

The present invention is directed to a bubble gum composition having improved flavor and sweetness impact and prolonged duration. The improved flavor and sweetness impact, and prolonged duration, have been found to result from the inclusion of three specific ingredients in the bubble gum, in addition to conventional bubble gum ingredients. The three ingredients which are used together in accordance with the invention are: a) a spray dried fruit flavor ingredient containing a high loading (30% or more) of active fruit flavor, b) encapsulated acesulfame-K, and c) separately encapsulated aspartame. The respective quantities of the three ingredients in the bubble gum are optimized, so as to provide a pleasing overall sweetness and flavor impact having prolonged duration.

With the foregoing in mind, it is a feature and advantage of the invention to provide an improved bubble gum or other fruit flavored chewing gum having a pleasing sweetness and flavor impact.

It is also a feature and advantage of the invention to provide an improved bubble gum or other fruit flavored chewing gum having a pleasing sweetness and flavor of prolonged duration.

The foregoing features and advantages of the invention will become further apparent from the following detailed description of the presently preferred embodiments, taken in conjunction with the accompanying examples and figures. The detailed description, examples and figures are intended to be illustrative rather than limitative, with the scope of the invention being defined by the appended claims and equivalents thereof.

BRIEF DESCRIPTION OF THE DRAWINGS

FIG. 1 shows the sweetness intensity as a function of chewing time for a bubble gum of the invention and a control.

FIG. 2 shows the flavor intensity as a function of time for a bubble gum of the invention and a control.

DETAILED DESCRIPTION OF THE PRESENTLY PREFERRED EMBODIMENTS

In accordance with the invention, a bubble gum or other fruit flavored chewing gum is provided which includes three key ingredients in addition to conventional chewing gum ingredients. The three key ingredients are: a) spray dried fruit flavor ingredient, containing a high loading of active fruit flavor, b) encapsulated acesulfame-K, and c) separately encapsulated aspartame.

The spray dried fruit flavor ingredient includes about 30% by weight or more of active fruit flavor, and preferably includes about 40% by weight of active fruit flavor. The remainder of the spray dried flavor ingredient can be any conventional spray drying carrier such as starch. The term "starch" is defined herein to encompass any commonly known starch, starch mixture or modified starch. A modified starch may, for example, contain a maltodextrin. Other common ingredients that can be used in conjunction with modified starch include corn syrup solids, gum arabic, cellulose or other substances useful for spray drying.

Prior to spray drying, the starch is in a solution which preferably contains between 20–50% by weight dry solids and between 50–80% by weight water. A commercially available modified starch which is particularly suitable for spray drying is N-Lok, manufactured by the National Starch and Chemical Co. N-Lok is a product developed for spray drying that contains starch and corn syrup solids. Prior to spray drying, the N-Lok should first be mixed with water to form a solution containing between 30–40% by weight total dry solids and 60–70% by weight water.

The aqueous starch solution or other suitable carrier is then mixed with an appropriate quantity of fruit flavor ingredient and is blended for a time generally on the order of a few minutes, which is sufficient to ensure thorough mixing. A Waring blender, for example, can be used for this purpose. An antifoam agent can also be used to minimize foaming during blending. An example of a suitable antifoaming agent is F10 antifoam emulsion, manufactured by Dow Corning Co. Minor quantities of silicon dioxide can also be added to help thicken and stabilize the mixture prior to spray drying. When used, the silicon dioxide may constitute about 0.5–4.0% by weight of the spray drying mixture, excluding the water. The silicon dioxide can be a fused silicon such as Cabosil EH5 available from Cabot and Co., or Aerosil 300 available from Degussa.

After the components have been blended using a Waring blender, the mixture is homogenized to a stable emulsion. This homogenization can be accomplished using a Brinkman homogenizer with Model No. BAA45 attachment. The homogenization process typically requires about one minute. During mixing and homogenization, the temperature of the resulting emulsion may increase from room temperature (about 75° F.) to about 110°–120° F.

The stable emulsion can then be spray dried, preferably using nozzle atomization with an inlet air temperature of about 200° C. (about 390° F.) and an outlet temperature of about 75°–90° C. (about 167°–195° F.). The preferred equipment used for spray drying is the Niro Atomizer made by Niro Corp.

The final spray dried flavor ingredient is a fluffy powder that contains at least about 30% by weight fruit flavor (preferably about 40%), between 0–8% by weight water (preferably about 4%) and a remainder of carrier. These percentages may vary somewhat depending on the type of carrier and the type of fruit flavor employed. The spray dried flavor ingredient should be added to the chewing gum in an amount sufficient to ensure an active flavor concentration of about 0.01% to about 0.60% by weight of the chewing gum, preferably about 0.02% to about 0.40% by weight of the chewing gum, most preferably about 0.16% by weight of the chewing gum. At a 40% loading of active flavor, this means that the spray dried flavor ingredient should be present in a quantity of about 0.025% to about 1.5% by weight of the chewing gum, preferably about 0.05% to about 1.0% by weight of the chewing gum, most preferably about 0.40% by weight of the chewing gum.

The encapsulated acesulfame-K ingredient can be prepared using any conventional encapsulation technique which is effective for acesulfame-K. In the preferred embodiment, the encapsulated acesulfame-K is encapsulated using polyvinyl acetate and includes about 25% by weight acesulfame-K and about 75% by weight polyvinyl acetate, the latter having a molecular weight of about 50,000 to about 80,000. The preferred method of encapsulating the acesulfame-K is described in detail in U.S. Pat. No. 4,978,537, issued to Song, the entire disclosure of which is incorporated herein by reference. Molten polyvinyl acetate is mixed with the acesulfame-K using an extruder, at a temperature of about 110°–150° C. (preferably 110°–120° C.), and the mixture is formed into a fiber by melt spinning. The fiber may be stretched, causing the polyvinyl acetate to orient itself longitudinally. The fibers may be stretched by applying a draw, or stretching force, to the fibers. The draw can be applied using a winder or by venturi after the fibers exit the extruder die.

The fiber is then cut. In the encapsulation product, the active agent is dispersed throughout the support matrix (i.e. the polyvinyl acetate, in the preferred embodiment) and may be in contact with itself forming a contiguous phase within the support matrix. The acesulfame-K, however, does not necessarily have to be in a contiguous phase. The ends of the polyvinyl acetate support matrix have openings, exposing the acesulfame-K. Additionally, the acesulfame-K may be exposed along the sides of the fiber. The amount of acesulfame-K within the fiber may vary between about 10% and about 55% by weight of the fiber. Preferably, the acesulfame-K constitutes about 25% by weight of the fiber. Preferably, the fibers are of a size such that they can pass through a 60-mesh screen.

The encapsulated acesulfame-K ingredient should be added to the chewing gum in an amount sufficient to ensure an active acesulfame-K concentration of about 0.025% to about 0.25% by weight of the chewing gum, preferably about 0.050% to about 0.20% by weight of the chewing gum, most preferably about 0.125% by weight of the chewing gum. At a 25% loading of acesulfame-K within the encapsulation product, this means that the encapsulated acesulfame-K ingredient should be present in a quantity of about 0.10% to about 1.0% by weight of the chewing gum, preferably about 0.20% to about 0.80% by weight of the chewing gum, most preferably about 0.50% by weight of the chewing gum.

The encapsulated aspartame ingredient can be prepared using any conventional encapsulation technique which is effective for aspartame. In the preferred embodiment, the encapsulated aspartame ingredient is prepared using a mixture of hydroxypropyl methylcellulose (HPMC) and zein, and includes about 75% by weight aspartame, about 23% combined weight of HPMC and zein, and about 2% by weight water. The preferred method of encapsulating the aspartame is described in detail in U.S. Pat. No. 4,931,295, issued to Courtright et al., the entire disclosure of which is incorporated herein by reference. A quantity of zein, solvent for zein, and water soluble modified cellulose compound (preferably HPMC) are mixed together to form a modified zein solution. The modified zein solution is applied to the aspartame to form a damp mix. The damp mix is then dried to produce the encapsulated aspartame ingredient.

Preferably, the zein is initially dissolved in water having a pH of about 11.5 to about 12.1, in a concentration of about 13% zein by weight of the solution. The HPMC is added to the solution at about 2% by weight of the solution, i.e. about 15% by weight of the zein, the form the modified zein solution. The modified zein solution is then added to the aspartame to form a damp mix, with the modified zein solution constituting about 15% to about 45% by weight of the damp mix. As a result, the final dried encapsulated aspartame ingredient contains about 4% to 25% by weight zein, about 0.2% to about 10% by weight HPMC, about 2% to about 5% water, and about 65% to about 94% by weight aspartame. Most preferably, the encapsulated aspartame ingredient contains about 20% by weight zein, about 3% by weight HPMC, about 2% by weight water and about 75% by weight aspartame.

The mixing of the aspartame and modified zein solution can be carried out using a planetary type mixer. The drying can be accomplished by spreading the damp mix onto drying trays and drying the damp mix in an oven at 170° F. for 16 to 20 hours. The encapsulated product can then be ground into powder using a Fitzmil grinder at high speed, having a 0.04 inch screen.

The encapsulated aspartame ingredient should be added to the chewing gum in an amount sufficient to ensure an active aspartame concentration of about 0.0075% to about 0.30% by weight of the chewing gum, preferably about 0.05% to about 0.15% by weight of the chewing gum, most preferably about 0.09% by weight of the chewing gum. At a 75% loading of aspartame within the encapsulation product, the encapsulated aspartame ingredient should be present in a quantity of about 0.01% to about 0.40% by weight of the chewing gum, preferably about 0.067% to about 0.20% by weight of the chewing gum, most preferably about 0.12% by weight of the chewing gum.

A chewing gum composition generally includes a water soluble bulk portion, a water insoluble chewing gum base portion and one or more flavoring agents. The water soluble portion dissipates with the flavoring agents over a period of time during chewing. The gum base portion is retained in the mouth throughout the chewing process.

The insoluble gum base generally includes elastomers, resins, fats, oils, waxes, softeners and inorganic fillers. The elastomers may include polyisobutylene, isobutylene-isoprene copolymer, styrene butadiene rubber and natural latexes such as chicle. The resins may include polyvinyl acetate and terpene resins. Low molecular weight polyvinyl acetate is a preferred resin. Facts and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candellia, carnauba and polyethylene wax. The present invention contemplates the use of any commercially acceptable chewing gum base.

The gum base typically also includes a filler component such as calcium carbonate, magnesium carbonate, talc, dicalcium phosphate and the like; softeners, including glycerol monostearate and glycerol triacetate; and optional ingredients such as antioxidants, colors and emulsifiers. The gum base constitutes between 5–95% by weight of the chewing gum composition.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5–15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5–95% by weight of the chewing gum, more typically 20–80% by weight of the chewing gum and most commonly 30–60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

High intensity sweeteners are also present and may be used with sugarless sweeteners. The present invention contemplates the use of both encapsulated acesulfame-K and encapsulated aspartame in the quantities described above. However, additional high intensity sweeteners can also be used if desirable. Typically, high intensity sweeteners are at least 20 times sweeter than sucrose. Possible additional high intensity sweeteners include but are not limited to sucralose, salts of acesulfame, alitame, glycyrrhizin, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may also provide further sweetness such as with aqueous sugar or alditol solutions.

Flavoring agents should generally be present in the chewing gum in a total amount within the range of about 0.1–15% by weight of the chewing gum, preferably between about 0.2–5.0% by weight of the chewing gum, most preferably between about 0.5–2.5% by weight of the chewing gum. Flavoring agents may include essential oils, synthetic flavors, fruit esters or mixtures thereof including but not limited to oils derived from plants and fruits such as citrus oils and fruit essences. Artificial flavoring agents and components may also be used. Natural and artificial flavoring agents may be combined in any sensorially acceptable fashion.

The present invention contemplates the use of at least one fruit flavor in the form of a high load spray dried flavor ingredient as described herein. Typically, additional quantities of fruit flavor, not in the spray dried form, will also be employed. Fruit flavors which are contemplated for use with the invention include, but are not limited to, banana (amyl acetate), cherry (benzaldehyde), apple (isoamyl isovalerate), pineapple (ethyl butyrate), grape (methyl anthranilate), strawberry (ethyl methyl phenyl glycidate), isoamyl acetate, isobutyl acetate, lemon oil, orange oil, other natural oils, combinations such as the commonly know tutti frutti and bubble gum flavors, and other combinations of the foregoing. A fruit flavor may also contain methyl salicylate and/or vanillin.

A typical bubble gum composition contains between 0.1 and 15.0 weight percent total fruit flavor, more commonly between 0.2 and 5.0 weight percent total fruit flavor and most commonly about 0.5–2.5 weight percent total fruit flavor. A typical fruit-flavored gum composition other than bubble gum contains about the same level of fruit flavor as a typical bubble gum.

The preferred amount of fruit flavor increases with the percentage of the base component in the chewing gum. A typical bubble gum contains between 10 and 90 weight percent base, preferably between 15 and 50 weight percent base and most preferably between 20 and 35 weight percent base. A typical fruit flavored gum other than bubble gum contains between 5 and 95 weight percent base, preferably between 10 and 50 weight percent base and most preferably between 20 and 30 weight percent base. Bubble gum base typically contains higher levels of styrene butadiene rubber and/or high molecular weight polyvinyl acetate, than regular gum base.

Optional ingredients such as colors, emulsifiers, pharmaceutical agents and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets and cutting into sticks, extruding into chunks, or casting into pellets. Generally, the ingredients are mixed by first melting the gum base and adding it the running mixer. The gum base may alternatively be melted in the mixer. Color and emulsifiers can be added at this time.

A softener such as glycerin can be added next along with syrup and part of the bulk portion. Further parts of the bulk portion may then be added to the mixer. Flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

A wide range of changes and modifications of the embodiments of the invention described above will be apparent to persons skilled in the art. The following examples are not to be construed as imposing limitations on the invention, but are included merely to illustrate preferred embodiments.

EXAMPLE 1

Bubble gum batches on the order of 970 pounds each, were prepared according to the following formulae:

| Ingredient | Bubble Gum A (% By Weight) | Bubble Gum B (% By Weight) |
| --- | --- | --- |
| Gum Base | 19.89 | 19.89 |
| Glycerine | 3.11 | 3.11 |
| Glucose | 8.29 | 8.29 |
| Lecithin | 0.52 | 0.52 |
| Red color | 0.07 | 0.07 |
| Encapsulated aspartame (75% active) | — | 0.12 |
| Encapsulated acesulfame-K (25% active) | — | 0.50 |
| Spray dried fruit flavor (40% active) | — | 0.40 |
| Sugar | 67.35 | 66.33 |
| Fruit Flavor | 0.77 | 0.77 |
| TOTAL | 100.0 | 100.0 |

Bubble Gum A and Bubble Gum B were consumer tested by 50 boys ages 8–12. The specific age breakdown was 8: 9 boys; 9: 13 boys; 10: 15 boys; 11: 3 boys; and 12: 10 boys. After chewing both gums, the boys were interviewed individually. Overall, 40 boys (80% of the total) preferred Bubble Gum B over Bubble Gum A, while 10 boys (20% of the total) preferred Bubble Gum A over Bubble Gum B.

An equal number of boys, 40, responded that Bubble Gum B had extended flavor compared to Bubble Gum A. Ten of the boys responded that Bubble Gum A had extended flavor compared to Bubble Gum B. On average, the 50 boys indicated that the flavor of Bubble Gum B ended after 4 minutes, 55 seconds. On average, the 50 boys indicated that the flavor of Bubble Gum A ended after 4 minutes, 34 seconds.

Bubble Gum A and Bubble Gum B were also chewed and evaluated using an expert sensory panel. Each of the five panelists chewed both bubble gums for twelve minutes, and rated each sample at various time intervals, for sweetness intensity and flavor intensity, using scales of 0 to 15. Referring to FIG. 1, Bubble Gum B was rated as having more intense sweetness than Bubble Gum A at all times subsequent to the first two minutes of chewing. Referring to FIG. 2, Bubble Gum B was rated as having more intense flavor than Bubble Gum A at all times subsequent to the first one minute of chewing.

Based on the foregoing consumer tests and expert panel evaluations, it was concluded that Bubble Gum B, which embodies high load spray dried flavor, encapsulated aspartame, and separately encapsulated acesulfame-K, has more intense and longer lasting sweetness and flavor, and is generally preferred, over the control Bubble Gum A.

While the embodiments of the invention disclosed herein are presently considered to be preferred, various modifications and improvements can be made without departing from the spirit and scope of the invention. The scope of the invention is indicated in the appended claims, and all changes which come within the meaning and range of equivalency of the claims are intended to be embraced therein.

We claim:

1. A chewing gum composition comprising;

a water soluble bulk portion;
a chewing gum base;
one or more fruit flavoring agents not spray dried;
a spray dried fruit flavor ingredient which includes at least about 30 weight percent active fruit flavor and a carrier;
an encapsulated acesulfame-K ingredient; and
a separately encapsulated aspartame ingredient.

2. The chewing gum composition of claim 1, wherein the fruit flavoring agent not spray dried comprises a flavor selected from the group consisting of orange oil, lemon oil, banana, cherry, apple, pineapple, grape, strawberry, tutti frutti, and combinations thereof.

3. The chewing gum composition of claim 1, wherein the spray dried fruit flavor ingredient includes about 40 weight percent active fruit flavor.

4. The chewing gum composition of claim 1, wherein the active fruit flavor in the spray dried fruit flavor ingredient comprises a flavor selected from the group consisting of orange oil, lemon oil, banana, cherry, apple, pineapple, grape, strawberry, tutti frutti, and combinations thereof.

5. The chewing gum composition of claim 1, wherein the spray dried fruit flavor ingredient is present in an amount sufficient to ensure an active flavor concentration of about 0.01% to about 0.60% by weight of the chewing gum.

6. The chewing gum composition of claim 1, wherein the spray dried fruit flavor ingredient is present in an amount sufficient to ensure an active flavor concentration of about 0.02% to about 0.40% by weight of the chewing gum.

7. The chewing gum composition of claim 1, wherein the spray dried fruit flavor ingredient is present in an amount sufficient to ensure an active flavor concentration of about 0.16% by weight of the chewing gum.

8. The chewing gum composition of claim 1, wherein the encapsulated acesulfame-K ingredient comprises about 10% to about 55% active acesulfame-K by weight of the encapsulated ingredient.

9. The chewing gum composition of claim 1, wherein the encapsulated acesulfame-K ingredient comprises about 25% acesulfame-K by weight of the encapsulated ingredient.

10. The chewing gum composition of claim 1, wherein the encapsulated acesulfame-K ingredient comprises acesulfame-K encapsulated in a matrix comprising polyvinyl acetate.

11. The chewing gum composition of claim 10, wherein the polyvinyl acetate has a molecular weight of about 50,000 to about 80,000.

12. The chewing gum composition of claim 1, wherein the encapsulated acesulfame-K ingredient is present in an amount sufficient to ensure an active acesulfarme-K concentration of about 0.025% to about 0.25% by weight of the chewing gum.

13. The chewing gum composition of claim 1, wherein the encapsulated acesulfame-K ingredient is present in an amount sufficient to ensure an active acesulfame-K concentration of about 0.050% to about 0.20% by weight of the chewing gum.

14. The chewing gum composition of claim 1, wherein the encapsulated acesulfame-K ingredient is present in an amount sufficient to ensure an active acesulfame-K concentration of about 0.125% by weight of the chewing gum.

15. The chewing gum composition of claim 1, wherein the encapsulated aspartame ingredient comprises about 65% to about 94% aspartame by weight of the encapsulated ingredient.

16. The chewing gum composition of claim 1, wherein the encapsulated aspartame ingredient comprises about 75% aspartame by weight of the encapsulated ingredient.

17. The chewing gum composition of claim 1, wherein the encapsulated aspartame ingredient comprises aspartame and an encapsulation mixture of HPMC and zein.

18. The chewing gum composition of claim 17, wherein the encapsulated aspartame ingredient comprises about 4% to about 25% by weight zein, about 0.2% to about 10% by weight HPMC, about 2% to about 5% by weight water, and about 65% to about 94% by weight aspartame.

19. The chewing gum composition of claim 1, wherein the encapsulated aspartame ingredient is present in an amount sufficient to ensure an active aspartame concentration of about 0.0075% to about 0.30% by weight of the chewing gum.

20. The chewing gum composition of claim 1, wherein the encapsulated aspartame ingredient is present in an amount sufficient to ensure an active aspartame concentration of about 0.05% to about 0.15% by weight of the chewing gum.

21. The chewing gum composition of claim 1, wherein the encapsulated aspartame ingredient is present in an amount sufficient to ensure an active aspartame concentration of about 0.09% by weight of the chewing gum.

22. A method of preparing a fruit flavored chewing gum, comprising the steps of:
providing a water soluble bulk portion, a chewing gum base, and one or more fruit flavoring agents not spray dried;
providing a spray dried fruit flavor ingredient which includes at least about 30 weight percent active fruit flavor and a carrier;
providing an encapsulated acesulfame-K ingredient;
providing a separately encapsulated aspartame ingredient; and
thoroughly blending the water soluble bulk portion, chewing gum base, fruit flavoring agent, spray dried fruit flavor ingredient, encapsulated acesulfame-K ingredient and encapsulated aspartame ingredient together in a mixer.

23. The method of claim 22, wherein the spray dried fruit flavor ingredient is prepared by a method comprising the following steps:
preparing an aqueous carrier solution including about 20–50% by weight solids and about 50–80% by weight water;
blending the aqueous carrier solution with the fruit flavor to form a mixture;
homogenizing the mixture to form a stable emulsion; and
spray drying the stable emulsion to form the spray dried fruit flavor ingredient.

24. The method of claim 23, wherein the carrier comprises starch.

25. The method of claim 24, wherein the starch comprises modified starch.

26. The method of claim 22, wherein the encapsulated acesulfame-K ingredient is prepared by a method comprising the following steps:
mixing the acesulfame-K with an encapsulation material using an extruder, to form a mixture;

forming the mixture into a fiber by melt spinning;
stretching the fiber; and
cutting the fiber.

27. The method of claim 26, wherein the encapsulation material comprises polyvinyl acetate.

28. The method of claim 28, wherein the polyvinyl acetate has a molecular weight of about 50,000 to about 80,000.

29. The method of claim 26, wherein the extruder is heated to a temperature of about 100°–150° C.

30. The method of claim 27, wherein the extruder is heated to a temperature of about 100°–120° C.

31. The method of claim 26, wherein the fibers are stretched by applying a draw to the fibers as the fibers exit the extruder through a die.

32. The method of claim 26, wherein the fibers are stretched and cut so that the fibers can pass through a 60-mesh screen.

33. The method of claim 22, wherein the encapsulated aspartame ingredient is prepared by a method comprising the following steps:

preparing an aqueous solution of encapsulation material;
mixing the aspartame with the aqueous encapsulation material solution to form a damp mix;
drying the damp mix to form an encapsulation product; and
grinding the encapsulation product.

34. The method of claim 33, wherein the encapsulation material comprises a mixture of HPMC and zein.

35. The method of claim 34, wherein the HPMC is present in an amount of about 15% by weight of the zein.

36. The method of claim 33, wherein the aqueous solution of encapsulation material is prepared by adding the encapsulation material to water having a pH of about 11.5 to about 12.1.

37. The method of claim 33, wherein the aspartame is mixed with the aqueous solution of encapsulation material using a planetary mixer.

38. The method of claim 33, wherein the drying is carried out in an oven at about 170° F. for about 16–20 hours.

* * * * *

UNITED STATES PATENT AND TRADEMARK OFFICE
CERTIFICATE OF CORRECTION

PATENT NO. : 5,334,397
DATED : August 2, 1994
INVENTOR(S) : Ronald L. Ream et al.

It is certified that error appears in the above-indentified patent and that said Letters Patent is hereby corrected as shown below:

Column 8, line 68, delete ";" and substitute --:--.

Column 9, line 55, delete "sulfarme" and substitute --sulfame--.

Column 11, line 6, delete "28" and substitute --27--.

Signed and Sealed this

Twenty-sixth Day of December, 1995

Attest:

BRUCE LEHMAN

Attesting Officer

Commissioner of Patents and Trademarks